I. T. WILLIAMS.
WHIRLIGIG CART.
APPLICATION FILED OCT. 1, 1914.
1,142,214.
Patented June 8, 1915.
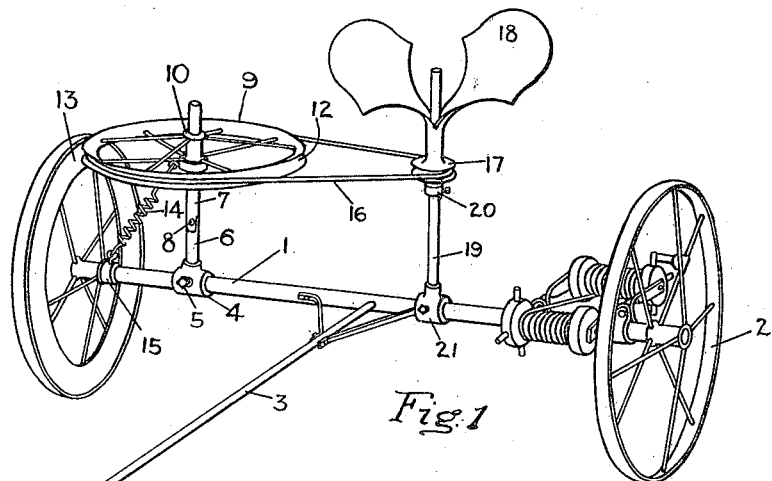
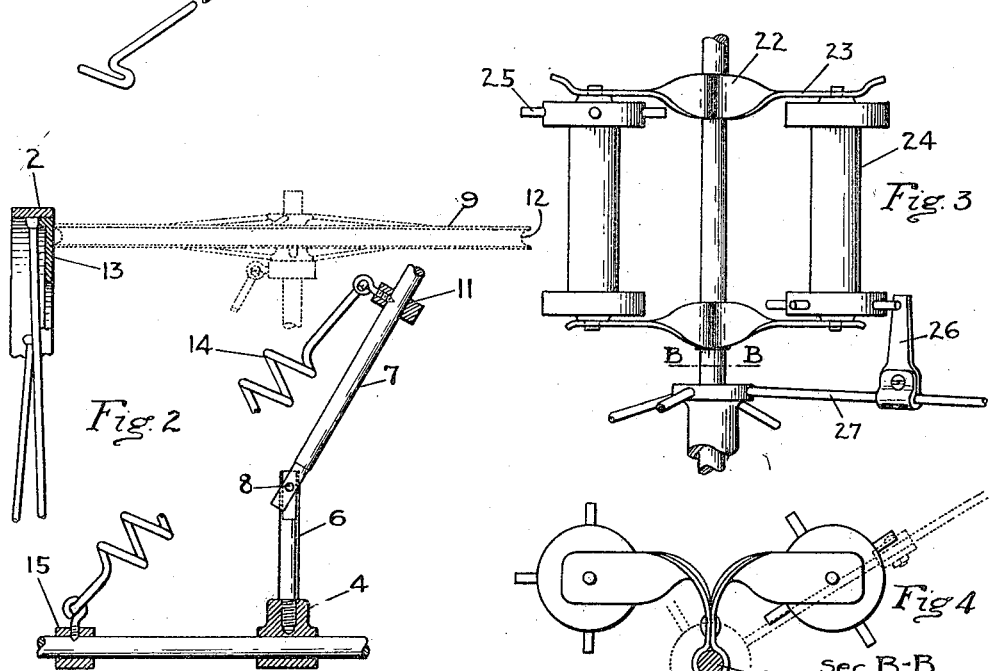
WITNESSES
INVENTOR
Ira T. Williams,
BY La Porte, Bean & Graham
ATTORNEY

UNITED STATES PATENT OFFICE.

IRA T. WILLIAMS, OF DECATUR, ILLINOIS.

WHIRLIGIG-CART.

1,142,214.  Specification of Letters Patent.  Patented June 8, 1915.

Application filed October 1, 1914. Serial No. 864,376.

*To all whom it may concern:*

Be it known that I, IRA T. WILLIAMS, a citizen of the United States, a resident of Decatur, in the county of Macon and State of Illinois, have invented certain new and useful Improvements in Whirligig-Carts, of which the following is a specification.

My invention relates to improvements in toys and is particularly directed to what I term a whirligig cart, that is a cart which is adapted to be wheeled and having a whirligig mounted thereon and operated from the wheel, for the purpose of providing simple amusement for children.

The principal object of this invention is the provision of such a device which is simple in construction and operation, attractive in appearance and so constructed as to obviate any liability of a child injuring himself in the operation thereof.

A further object is the provision of means, whereby the distance that the cart had traveled may be determined.

To the accomplishment of the foregoing and such other objects as may hereinafter appear, my invention consists in the construction, combination and arrangement of parts hereinafter described and then sought to be defined in the appended claims, reference being made to the accompanying drawing forming a part hereof and which illustrates the preferred embodiment of my invention, it being understood, however, that various changes may be made in practice within the scope of the claims without digressing from my inventive idea.

In the drawing, Figure 1 represents a perspective view of the device constructed according to my invention; Fig. 2 is a detailed view of the manner of mounting the drive wheel, parts being shown in dotted lines to facilitate disclosure; Fig. 3 is a top plan view of the odometer showing the means for operating the same; Fig. 4 is an end view thereof.

Referring now to the drawings, the numeral 1 designates the shaft or axle which constitutes the frame of the cart, having the wheels 2 mounted on either end thereof and provided with the handle member 3. This cart is adapted to be wheeled along by a child and to actuate a whirligig for his amusement.

On one side of the axle or shaft 1 is mounted the sleeve or collar 4 adjustably held in place by set screw 5 and having the arm or extension 6 projecting vertically therefrom. To the upper end of this arm or extension 6 is pivotally connected the rod or shaft 7 by means of the pivot pin 8, the lower end of the rod or shaft 7 being bifurcated to embrace the reduced end of arm or extension 6, as shown particularly in Figs. 1 and 2. Rotatably mounted on this rod or shaft 7 is the driving wheel 9, having the hub 10 which is adapted to be held in place by means of the collar 11 on the rod or shaft 7. This driving wheel 9 has the grooved periphery 12 which is adapted to engage the extended bearing surface, shown in the form of the annular plate or ring member 13 on wheel 2 so that said driving wheel 9 is rotated when the cart is pushed. The driving wheel 9 is normally held with its periphery 12 in frictional engagement with the annular plate or ring member 13 by means of the resilient member 14, which is secured to the collar 11 and to another collar 15 on shaft or axle 1 adjacent the wheel 2. This construction holds these members in engagement so that the wheel 9 is driven, providing however, means whereby, if a child's finger or hand should be interposed between the wheels, the driving wheel can give so as not to injure or hurt the child in any way.

A flexible connector or belt 16 is mounted in the grooved periphery 12 of the driving wheel 9 and rotates the whirligig member, which has a small grooved pulley or wheel 17 provided thereon and the extended wings 18. This member is held in position on shaft 19 by means of a collar 20, this shaft being secured to collar 21 on the axle or shaft 1. It is therefore obvious that when the cart is pushed, the whirligig will be rotated, the size of the wheel 9 and pulley 17 being so proportioned that it is possible to obtain considerable speed in this rotation, so as to interest and amuse the children.

As a further means of amusement and interest, I provide an odometer or means whereby the distance traveled may be determined. This structure is shown in detail in Figs. 3 and 4 and includes the supporting brackets or members 22 which are clamped to the axle or shaft 1, as shown, having the laterally extended and resilient arms 23. I provide a pair of these supporting brackets or members so as to removably support between the corresponding pairs of arms 23 the spools or rolls 24. Each spool or roll is provided on one of its flanges with a plurality of pins or extensions 25 which are adapted to be engaged by the arm or extension 26, clamped to one of the spokes 27 of one of the wheels, so that as the cart is moved and the wheel rotated, one of the spools 24 will be rotated positively. I provide a cord or string of a predetermined length which is adapted to be wound upon the spool positively actuated, so that the distance traveled may be determined by the amount of the cord wound upon the roll. When this roll becomes full or the length of the cord wound, it is only necessary to reverse the rolls or spools, and start to wind the cord or string upon the other roll or spool, it being evident that these rolls or spools are readily removable as they are only held in position by means of the resilient arms or extensions 23.

The device may be decorated in any manner and painted in any color, so as to be attractive in appearance and pleasing to the eye. Its operation affords endless amusement, particularly to the children. Its construction is simple and strong and all possibility of injury is obviated. It is interesting and instructive.

What I claim is:—

1. In a device of the character described and in combination, a frame, wheels supporting said frame, a driving wheel swingably mounted relative to said frame and adapted to bear against one of said first mentioned wheels, whereby when said device is moved said driving wheel will be rotated, a whirligig mounted on said frame and driving connections between said driving wheel and said whirligig to operate the same.

2. In a device of the character described and in combination, a frame, wheels supporting said frame, a driving wheel swingably mounted relative to said frame and adapted to bear against one of said first mentioned wheels, whereby when said device is moved, said driving wheel will be rotated, a whirligig mounted on said frame and driving connections between said driving wheel and said whirligig to operate the same and resilient means normally holding said driving wheel against said one of said first mentioned wheels.

3. In a toy of the character described and in combination, a shaft or axle comprising a frame, wheels mounted on the ends thereof, an arm or extension secured to said shaft or axle having a rod or shaft pivotally connected thereto, a driving wheel mounted on said rod or shaft, resilient means connected to said frame and said rod or shaft for normally holding said driving wheel in contact with one of said first mentioned wheels, a whirligig mounted on said shaft or axle, and driving connections between said driving wheel and said whirligig whereby when the toy is propelled, the whirligig will be rotated.

4. In a toy of the character described and in combination, a shaft or axle comprising the frame, wheels mounted on the ends thereof, one of said wheels having an annular plate or ring member secured thereto to provide a bearing surface, a driving wheel pivotally connected to said shaft or axle, resilient means for holding said driving wheel normally in contact with said bearing surface, a whirligig mounted on said frame and driving connections between said driving wheel and said whirligig whereby said whirligig is rotated when the toy is propelled.

5. In a toy of the character described and in combination, a shaft or axle comprising the frame, wheels mounted on the ends thereof, a whirligig mounted on said frame, connections between one of said wheels and said whirligig whereby when the toy is propelled the whirligig will be rotated, an odometer secured to said shaft or axle and adapted to be actuated by one of said wheels, said odometer comprising a plurality of supporting members or brackets having laterally extending arms, spools or rolls removably held between the pairs of corresponding arms and adapted to have a string or cord wound and unwound thereon, and means on said spools or rolls adapted to be actuated by one of said wheels.

In testimony whereof I sign my name in the presence of two subscribing witnesses.

IRA T. WILLIAMS.

Witnesses:
J. R. WILLIAMS,
RALPH S. GRAHAM.

Copies of this patent may be obtained for five cents each, by addressing the "Commissioner of Patents, Washington, D. C."